No. 867,025. PATENTED SEPT. 24, 1907.
W. B. ELLIS, DEC'D.
K. M. & E. E. ELLIS, EXECUTRICES.
HAY RAKE AND TEDDER.
APPLICATION FILED JAN. 26, 1906.
3 SHEETS—SHEET 3.
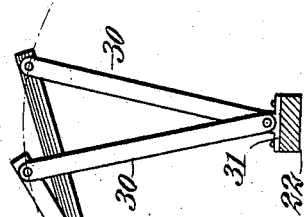
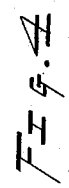
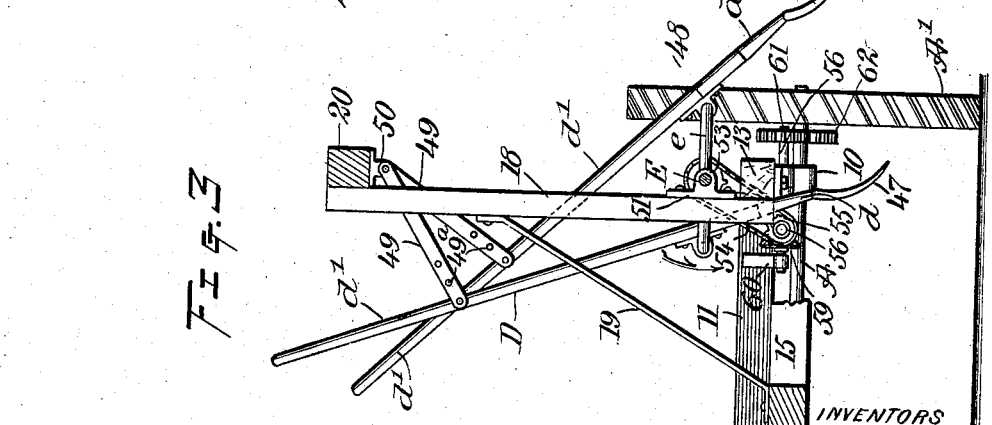
WITNESSES:
INVENTORS
Kittie M. Ellis
Ella E. Ellis
Executrices of the Estate of
William B. Ellis
deceased
BY
Munn & Co
ATTORNEYS

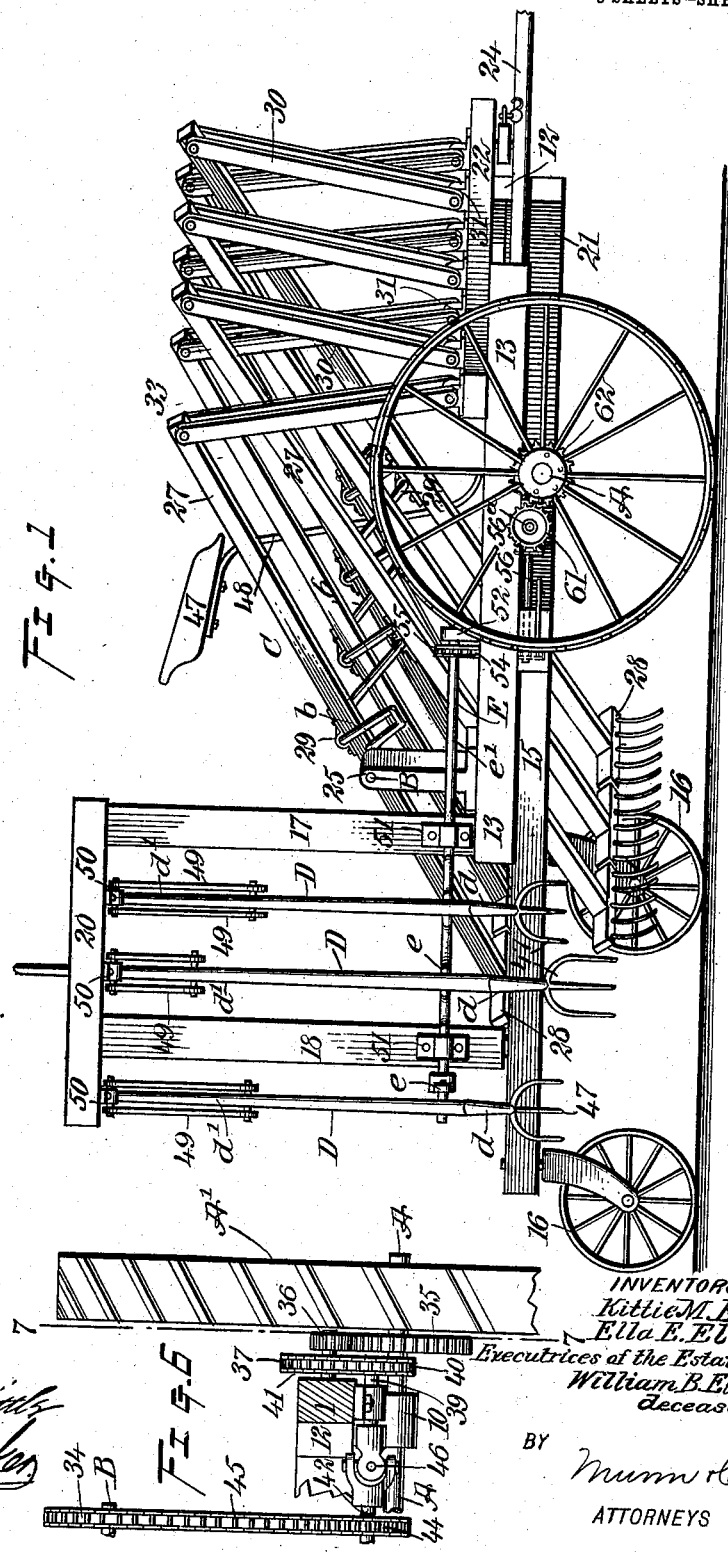

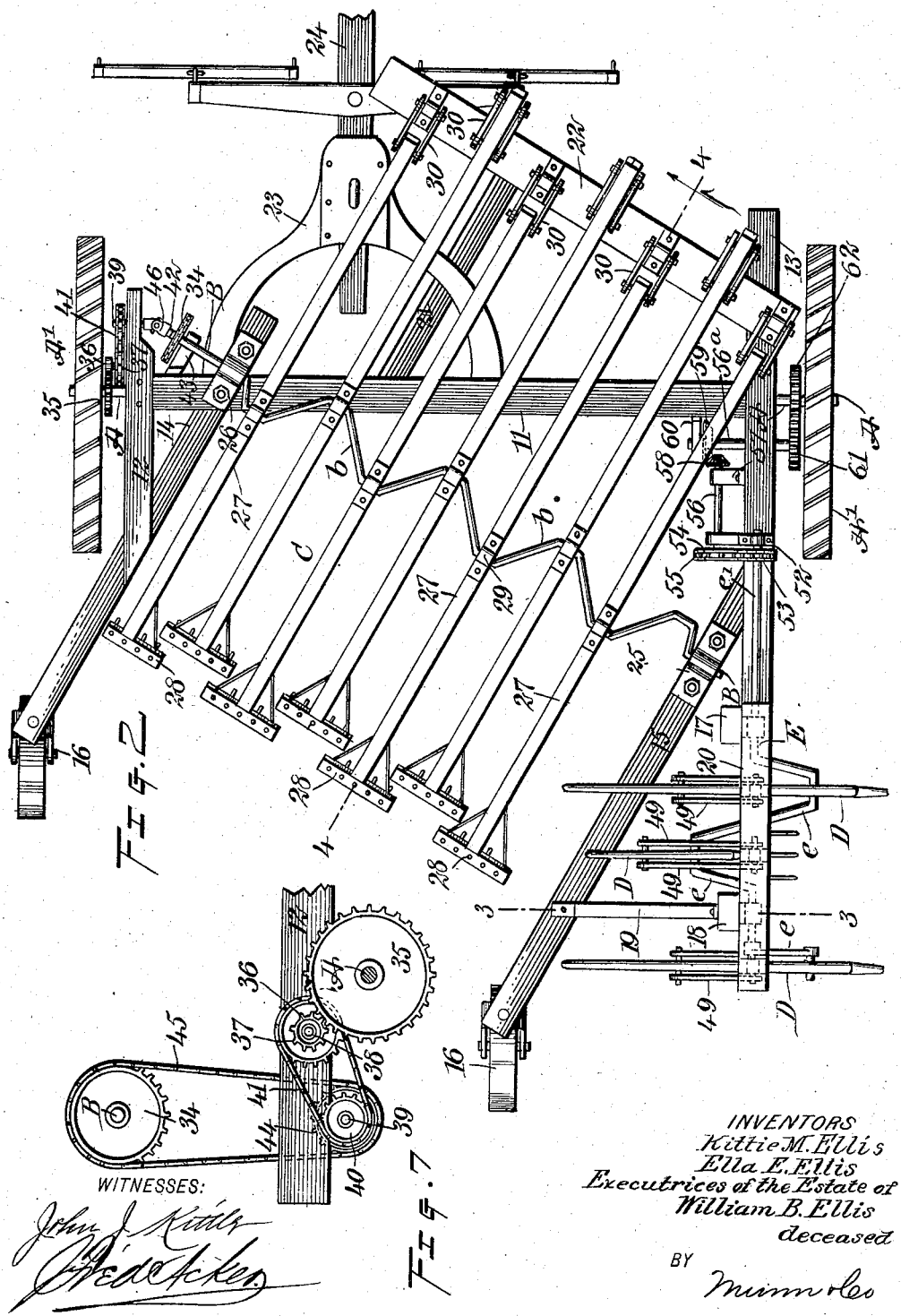

UNITED STATES PATENT OFFICE.

KITTIE M. ELLIS AND ELLA E. ELLIS, OF GREELEY, IOWA, EXECUTRICES OF WILLIAM B. ELLIS, DECEASED.

HAY RAKE AND TEDDER.

No. 867,025.  Specification of Letters Patent.  Patented Sept. 24, 1907.

Application filed January 26, 1906. Serial No. 298,007.

*To all whom it may concern:*

Be it known that we, KITTIE M. ELLIS and ELLA E. ELLIS, both citizens of the United States, and residents of Greeley, in the county of Delaware and State of Iowa, executrices of the estate of WILLIAM B. ELLIS, (late a citizen of the United States, and late a resident of Greeley, in the county of Delaware and State of Iowa, as by the duly-certified copy of letters testamentary hereto annexed will more fully appear,) and who did in his lifetime invent certain new and useful Improvements in Hay Rakes and Tedders, do declare the following to be a full, clear, and exact description of said invention.

The purpose of the invention is to provide a combined tedder and side hay rake of simple, durable and economic construction by means of which the hay is raked to the right-hand side of the implement and left in a windrow, and the tedders automatically act upon the windrowed hay and move it over to the right, leaving the hay in a most convenient position for the loader, enabling a loader to take up the hay without looping back over a portion of the ground that the rake has already covered.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the improved machine; Fig. 2 is a plan view of the same; Fig. 3 is a vertical detail section taken substantially on the line 3—3 of Fig. 2; Fig. 4 is a longitudinal vertical detail section taken substantially on the line 4—4 of Fig. 2; Fig. 5 is a detail plan view of the driving mechanism at the left-hand side of the machine; Fig. 6 is a vertical section taken practically on the line 6—6 of Fig. 5; and Fig. 7 is a detail vertical section taken substantially on the line 7—7 of Fig. 6.

A represents the axle of the machine, which axle is journaled in bearings 10 formed upon the under face of a transverse beam 11 constituting a portion of the frame of the machine, and at each end of the axle A a supporting wheel A is secured.

In the further construction of the frame of the machine a left-hand side piece 12, extending in direction of the front and the rear of the machine, is secured to the end of the transverse beam 11, and a parallel side beam 13 is located at the right-hand side of the machine, which latter beam 13 extends further forward and much further to the rear than does the opposing side beam 12, as is shown best in Fig. 2.

A diagonal side beam 14 is secured at its forward end to the under face of the transverse beam 11 near its end and is carried in direction of the left-hand side of the machine far enough to extend beyond the rear of the left-hand wheel A′; and this longitudinal diagonal beam 14 is likewise secured to the left-hand side beam 12. A parallel longitudinal diagonal beam 15 is located at the right-hand side of the machine, being secured to the under face of the right-hand side beam 13 at a point slightly to the rear of the right-hand supporting wheel A , as is also shown in Fig. 2. At the rear end of each diagonal side beam 14 and 15 a caster wheel 16 is mounted.

At the rear end of the right-hand side beam 13 an upright 17 is attached to the inner face of said side beam, as is shown in Figs. 1 and 2; and parallel with the upright 17, yet removed rearwardly therefrom a second upright 18 is provided, which is held in proper position by a brace 19 or its equivalent attached to the right-hand diagonal side beam 15 and to the said upright 18 near its upper end, as is illustrated in Fig. 3. The two uprights 17 and 18 are connected at the top by a cross bar 20 which preferably extends rearwardly beyond the rear upright 18, as is best shown in Fig. 1.

In the further construction of the frame of the machine, a forward diagonal bar 21 is attached at one end to the under face of the cross beam 11, and said beam 21 is carried forward in direction of the right-hand side of the machine, and upon the outer or forward end portion of this forward diagonal beam 21 a transverse diagonal beam 22 is secured, and said beam 22 is likewise attached at its right-hand end to the forward portion of the right hand side beam 13. This diagonal front beam 22 in its entirety is forward of the axle and most closely approaches the axle at its right-hand end. A hound 23 is attached to the under face of the transverse beam 11, and the major portion of said hound is to the left of the center of the said beam 11 as is shown in Fig. 2. The pole 24 is connected with the hound in any desired manner.

A standard 25 is secured to the upper face of the right-hand diagonal beam 15 near its forward end, and a corresponding standard 26 is located partially upon the cross beam 11 and partially upon the rear portion of the left-hand diagonal beam 14, as also shown in Fig. 2. Each of said standards is provided with a bearing at its upper end.

The straight end portions of a crank shaft B are journaled in the bearings on the standards 25 and 26, and said shaft B extends much farther beyond the left-hand standard than beyond the right-hand standard. The shaft B between the standards 25 and 26 is provided with a series of crank arms $b$, extending alternately in opposite directions. These crank arms are adapted to impart a reciprocating end movement to a series of rakes C, each rake comprising a straight shank 27 and a toothed head 28 at the rear end of the shank. Each shank 27 of a rake is provided with a bearing 29 at or about its center, and the said bearings receive the crank arms of the crank shaft, as is shown in Figs. 1, 2 and 4.

The shanks 27 of all of the rakes with the exception of the extreme right-hand rake, are pivoted at their forward ends between parallel pairs of links 30, which links are vertically placed and are pivoted at their lower ends to bearings 31 secured upon the forward diagonal beam 22, as is shown best in Figs. 1 and 4. The extreme right-hand rake is received at its forward end in an upper forked portion 33 of a single link 32, said link 32 being pivoted at its lower end on the right-hand spindle of the axle, as is clearly shown in Fig. 1. All of the links 30 and 32 are of sufficient length to give a decided pitch to the rakes from the front rearward and downward, as is shown in Fig. 1.

The crank shaft B is driven, and consequently rocking motion is imparted to the rakes by the following named mechanism, shown in Figs. 2, 5, 6 and 7. A sprocket wheel 34 is secured to the left-hand end of the crank shaft, and on the left-hand end of the axle between the frame and the left-hand supporting wheel A', a gear 35 is attached to the axle, and this gear 35 meshes with a pinion 36 attached in any suitable or approved manner to a gear 37, the attached gear and pinion being mounted to turn on a spud axle which extends from the left-hand side piece 12 of the frame. A shaft 39 is journaled in suitable bearings located at the under rear portion of the aforesaid left-hand frame beam 12, as is shown in Fig. 6, and this shaft 39 carries a sprocket wheel 40 connected with the sprocket wheel 37 by a chain belt 41.

A short shaft 42 is located at an angle to the inner end of the shaft 39, being just beneath the left-hand end of the crank shaft B as is shown in Figs. 5 and 6, and this shaft 42 is journaled in a suitable bearing 43, attached ordinarily to the transverse beam 11, and the said bearing, which is in the form of an arm, extends forward and in direction of the right-hand side of the machine, as shown in Fig. 2. The shaft 42 is driven from the shaft 39, and to that end the two shafts have a ball and socket or universal connection 46, as is clearly shown in Figs. 5 and 6. The crank shaft B is driven from the shaft 42 by securing to the outer end of said shaft 42 a sprocket wheel 44, which is connected by a chain 45 with the sprocket wheel 34 on the crank shaft B, as is shown in Figs. 6 and 7.

It will be observed that the series of rakes are located between the diagonal side beams 14 and 15 and have a diagonal relation to the axle, being given more or less of an inclination in direction of the left-hand side of the machine, so that as the machine is driven forward and the rakes are given a reciprocating end raking movement, the grain or straw taken up by the rake heads will be carried to the right-hand side of the machine and there deposited in a windrow.

In order that the windrow of grain or straw may be carried well outside of the right-hand wheel of the machine, a series of tedders D are employed, which operate simultaneously and in conjunction with the rakes to throw the grain or straw further to the right than can be done by the rakes and thus enable the loader to take up all of the grain or straw lying in a windrow without again traversing the path formerly passed over by the rakes. This tedder attachment is at the right-hand rear portion of the machine, is located at the uprights 17 and 18 and is constructed as follows: Each tedder D comprises a forked lower section d having any desired number of tines 47, and the said tines are concaved on their forward faces and convexed at their rear faces, and each forked section is attached to a handle section d'. Each handle section d' adjacent to its forked end is provided at its rear side with a bearing 48, and links 49 are pivotally attached to the handle section of each tedder, the links being located at each side of the handle section and the attachment being made at a point between the centers of the handles and their upper ends. The upper end portions of the links 49 are pivoted to bearings 50 secured to the under face of the cross piece 20 on the uprights 17 and 18. In the arrangement of the tedders they are vertically placed and two of them are located between the uprights 17 and 18 and one rearward of the rear upright 18 as is best shown in Figs. 1 and 3.

In connection with the lower portions of the tedders a crank shaft E is provided, mounted to turn in suitable bearings 51 secured to the outer faces of the uprights 17 and 18 near their lower ends; and the said shaft between the forward upright 17 and its rear end is provided with a series of crank arms e, extending alternately in opposite directions. The crank arms of the crank shaft E are made to pass through the bearings 48 on the lower portions of the tedders, so that as the shaft E is turned the tedders are given alternately a forward and a rearward movement and likewise more or less of a rotary movement.

The forward end e of the crank shaft E is straight and is mounted to turn in a bearing 52 on the right-hand side beam 13 of the frame. This end of the crank shaft E is provided with an attached sprocket wheel 53 which is connected by a belt 54 with a sprocket wheel 55 located on the rear end of a short shaft 56 mounted to turn in bearings 57 extending from the inner face of the right-hand side beam 13, as is shown in Fig. 2; and at the forward end of the short shaft 56 a bevel gear 58 is attached to said shaft, and this bevel gear 58 meshes with a similar gear 59, secured to a shaft 56$^a$ mounted to turn in bearings 60 parallel with the transverse beam 11. This shaft 56$^a$ extends out beyond the right-hand side of the machine, as is shown in Fig. 2, and has a gear 61 on its outer end. Said gear 61 is in mesh with a gear 62 which is on the right hand end of the axle A. In this manner, as the machine advances motion is imparted simultaneously to both the tedders and the rakes, causing them to work in perfect harmony to accomplish the ends mentioned.

Where the links 49 are connected with the tedders D said links are provided with apertures 49$^a$, so that the tedders can be adjusted to be given a greater or a less throw.

Having thus described the invention, we claim as new, and desire to secure by Letters Patent,—

1. In an agricultural implement, the combination with a wheel-supported frame and its axle, supporting wheels secured to the axle, rear supporting wheels for the frame, and a series of rakes operatively mounted on the said frame, said series having a diagonal relation with respect to the axle, the heads of the rakes being so placed as to direct the raked product to the right-hand side of the implement, of vertical supports located at the right-hand rear portion of the frame, a cross bar connecting said supports, tedders consisting of forked body sections and connected handle sections, the handle sections of the tedders extending up between the vertical supports, links pivotally connected with the handle sections of the tedders, and with the connecting bar of the said supports, a crank shaft, journaled at the lower portion of the said vertical supports, having crank arms alternately extending in opposite directions and pivotally connected with the handle sections of the tedders adjacent to their lower ends, a sprocket wheel secured at the forward end of said crank shaft, a shaft mounted to turn in the frame parallel with its right-hand side, provided with a sprocket wheel in chain connection with the sprocket wheel on the crank shaft, a bevel gear located at the forward end of said auxiliary shaft, a second auxiliary shaft journaled in the frame at right angles to the first-named auxiliary shaft, the second auxiliary shaft being provided with a bevel gear engaging with the bevel gear of the first-named auxiliary shaft, a gear at the outer end of the second auxiliary shaft, and a gear on the right hand end of the axle, meshing with the said gear on the second auxiliary shaft, for the purposes specified.

2. In an agricultural implement, a frame comprising a main cross beam, side beams attached to the ends of the cross beam, parallel auxiliary side beams having a diagonal position with relation to the transverse beam, inclining rearwardly in direction of the left-hand side of the implement, an axle journaled beneath the transverse beam, supporting wheels secured to the axle and caster wheels carried by the rear portion of the said diagonal beams, a crank shaft mounted to revolve on the frame, having a diagonal relation to said transverse beam, and diverging from said beam at the right-hand side of the machine, said crank shaft being provided with alternately arranged crank arms, a series of rakes located between the diagonal beams of the frame, the rake heads being at the rear and the shanks of the said rakes being pivotally mounted on the crank arms of the crank shaft, said shanks of the rakes occupying a downwardly and rearwardly inclined position, links pivotally connected with the forward ends of the shanks of the said rakes, a diagonal forward bar supported by the frame, diverging at its left-hand end from the transverse beam of the frame, a sprocket wheel secured on the left-hand end of said crank shaft, a gear wheel mounted on the left-hand end of the axle, a short shaft journaled at the forward left-hand portion of the frame, a chain of gearing between the axle and the said forward shaft to rotate the latter, a second forward shaft journaled at the forward portion of the frame and having a universal connection with the first-named forward shaft, and a driving connection between the second forward shaft and the sprocket wheel on the crank shaft.

In testimony whereof we have signed our names to this specification in the presence of two subscribing witnesses.

KITTIE M. ELLIS,
ELLA E. ELLIS,
*Executrices of the estate of William B. Ellis, deceased.*

Witnesses:
JOSEPH HUTCHINSON,
EDWARD COOK.